United States Patent
Shu et al.

(10) Patent No.: US 11,763,549 B1
(45) Date of Patent: Sep. 19, 2023

(54) METHOD AND APPARATUS FOR TRAINING CELL DEFECT DETECTION MODEL

(71) Applicant: CONTEMPORARY AMPEREX TECHNOLOGY CO., LIMITED, Ningde (CN)

(72) Inventors: Annan Shu, Ningde (CN); Guannan Jiang, Ningde (CN); Zhiyu Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/308,374

(22) Filed: Apr. 27, 2023

Related U.S. Application Data

(63) Continuation of application No. PCT/CN2022/108873, filed on Jul. 29, 2022.

(51) Int. Cl.
| | |
|---|---|
| *G06K 9/00* | (2022.01) |
| *G06V 10/774* | (2022.01) |
| *G06T 7/00* | (2017.01) |
| *G06V 10/764* | (2022.01) |
| *G06V 10/44* | (2022.01) |
| *G06V 10/74* | (2022.01) |

(52) U.S. Cl.
CPC .......... *G06V 10/774* (2022.01); *G06T 7/0004* (2013.01); *G06V 10/44* (2022.01); *G06V 10/761* (2022.01); *G06V 10/764* (2022.01); *G06T 2207/20081* (2013.01); *G06T 2207/30108* (2013.01)

(58) Field of Classification Search
CPC .... G06V 10/774; G06V 10/761; G06V 10/44; G06V 10/764; G06T 7/0004; G06T 2207/20081; G06T 2207/30108
See application file for complete search history.

(56) References Cited

U.S. PATENT DOCUMENTS

2023/0039805 A1\* 2/2023 Yu .......................... G06T 7/0008

FOREIGN PATENT DOCUMENTS

| CN | 109472284 | A | \* | 3/2019 |
| CN | 111598861 | A | \* | 8/2020 |
| CN | 111986174 | A | \* | 11/2020 |
| CN | 114120066 | A | | 3/2022 |
| WO | WO 2022036953 | A1 | \* | 2/2022 |

\* cited by examiner

*Primary Examiner* — Samir A Ahmed
(74) *Attorney, Agent, or Firm* — ANOVA LAW GROUP, PLLC

(57) ABSTRACT

A method for training a cell defect detection model includes training a defect classification model that includes an output layer using a plurality of first sample images so that a defect classification model obtained through training is capable of predicting a plurality of first-preset-category defects of a cell, inputting a second sample image to a defect classification model with at least an output layer removed to obtain a sample feature vector of the second sample image, inputting the sample feature vector of the second sample image to a backbone model to obtain a predicted defect classification result of the second sample image, and adjusting, based on a second-preset-category defect and the predicted defect classification result of the second sample image, parameters of the backbone model and the defect classification model with at least the output layer removed.

19 Claims, 9 Drawing Sheets

1000

S1001: Obtain a plurality of first sample images, where the plurality of first sample images include sample images corresponding to a plurality of first-preset-category defects of a cell, and the plurality of first sample images include a plurality of groups of first sample images S1002: For each group of first sample images, use the group of first sample images to train a corresponding defect classification submodel so that a defect classification submodel obtained through training is capable of predicting a group of first-preset-category defects corresponding to the group of first sample images S1003: Perform weighted calculation on corresponding parameters of defect classification submodels trained using the groups of first sample images S1004: Use parameters obtained through weighted calculation as the parameters of the defect classification model S1005: Obtain a second sample image, where the second sample image includes a second-preset-category defect of the cell S1006: Input the second sample image to the defect classification model with at least an output layer removed to obtain a sample feature vector of the second sample image S1007: Input the sample feature vector of the second sample image to a backbone model to obtain a predicted defect classification result of the second sample image S1008: Adjust, based on the second-preset-category defect and the defect classification result of the second sample image, parameters of the backbone model and the defect classification model with at least an output layer removed

FIG. 10

METHOD AND APPARATUS FOR TRAINING CELL DEFECT DETECTION MODEL

CROSS-REFERENCE TO RELATED APPLICATION

This application is a continuation of International Application No. PCT/CN2022/108873, filed on Jul. 29, 2022, the entire content of which is incorporated herein by reference.

TECHNICAL FIELD

This application relates to the fields of battery technologies and machine vision detection technologies, and in particular, to a method and apparatus for training a cell defect detection model, a method and apparatus for cell defect detection, an electronic device, a computer-readable storage medium, and a computer program product.

BACKGROUND

Energy conservation and emission reduction are crucial to the sustainable development of the automotive industry. Electric vehicles, with their advantages in energy conservation and emission reduction, have become an important part of sustainable development of the automobile industry. For electric vehicles, battery technology is an important factor in connection with their development.

In some cases, a rechargeable battery (a battery that can be charged after being discharged to activate active materials for continuous use, also known as secondary battery) includes a battery box and a plurality of batteries connected in series and/or in parallel in the battery box. The battery cell is the smallest unit for providing energy in a battery. An electrode assembly is a key component in which electrochemical reactions take place in the battery cell and mainly includes an anode electrode plate, a cathode electrode plate, and a separator that separates the anode electrode plate from the cathode electrode plate.

How a yield of cell production is improved is an urgent technical problem to be resolved in the art.

SUMMARY

This application is intended to resolve at least one of the technical problems in the related art. An objective of this application is to provide a method and apparatus for training a cell defect detection model, a method and apparatus for cell defect detection, an electronic device, a computer-readable storage medium, and a computer program product, to improve a yield of cell production.

According to a first aspect of this application, an embodiment provides a method for training a cell defect detection model. The defect detection model includes a backbone model and a defect classification model with at least an output layer removed. The method includes: obtaining a plurality of first sample images, where the plurality of first sample images include sample images corresponding to a plurality of first-preset-category defects of a cell; using the plurality of first sample images to train a defect classification model that includes an output layer so that a defect classification model obtained through training is capable of predicting a plurality of first-preset-category defects of the cell; obtaining a second sample image, where the second sample image includes a second-preset-category defect of the cell; inputting the second sample image to the defect classification model with at least an output layer removed to obtain a sample feature vector of the second sample image; inputting the sample feature vector of the second sample image to the backbone model to obtain a predicted defect classification result of the second sample image; and adjusting, based on a second-preset-category defect and the predicted defect classification result of the second sample image, parameters of the backbone model and the defect classification model with at least an output layer removed.

In the technical solution in this embodiment of this application, the defect classification model is first trained for the first-preset-category defects, and then the feature vector output by an intermediate layer of the defect classification model obtained through training is migrated to the backbone model. This not only makes a feature extracted by the defect classification model for the first-preset-category defects more accurate, facilitating subsequent classification of the backbone model, but also facilitates full use of existing model resources to avoid repeated training of new models. In this way, accuracy of the defect detection model in detecting cell defects, especially the first-preset-category defects, is improved. In addition, a speed for training the defect detection model is improved and training costs are reduced.

In some embodiments, the plurality of first-preset-category defects include at least one group of first-preset-category defects, each group of first-preset-category defects includes a plurality of first-preset-category defects, and similarities between image features of the first-preset-category defects in each group of first-preset-category defects are not less than a preset threshold. In the foregoing description, the defect classification model is pre-trained for similar first-preset-category defects. This enables the defect classification model to learn features of similar defects to improve accuracy of extracting the features of similar defects. In addition, the defect classification model needs only to precisely classify the first-preset-category defects and thus processes a small amount of information, thereby making training and calculation of the defect classification model faster.

In some embodiments, a similarity between an image feature of the second-preset-category defect and an image feature of any one of the plurality of first-preset-category defects is less than the preset threshold. In the foregoing description, the entire defect detection model is adjusted based on a sample image having a second-preset-category defect that is different from the first-preset-category defects so that the defect detection model can well identify the first-preset-category defects and the second-preset-category defect.

In some embodiments, the using a plurality of first sample images to train a defect classification model that includes an output layer so that a defect classification model obtained through training is capable of predicting a plurality of first-preset-category defects of a cell includes: for each of the plurality of first sample images, inputting the first sample image to the defect classification model that includes the output layer to obtain a predicted defect classification result of the first sample image; and adjusting parameters of the defect classification model based on the first-preset-category defect and the predicted defect classification result of the first sample image. In the foregoing description, a simple method is used to train the defect classification model for the first-preset-category defects to improve accuracy and efficiency of the defect classification model obtained through training.

In some embodiments, the plurality of first sample images include a plurality of groups of first sample images, the at least one group of first-preset-category defects includes a plurality of groups of first-preset-category defects, and a cell defect category in each group of first sample images pertains to a group of first-preset-category defects in one-to-one correspondence with the group of first sample images. The using a plurality of first sample images to train a defect classification model that includes an output layer so that a defect classification model obtained through training is capable of predicting a plurality of first-preset-category defects of a cell includes: for each group of first sample images, using the group of first sample images to train a corresponding defect classification submodel so that a defect classification submodel obtained through training is capable of predicting a group of first-preset-category defects corresponding to the group of first sample images; and determining parameters of the defect classification model based on parameters of a defect classification submodel obtained through training respectively using each of the plurality of groups of first sample images. In the foregoing description, corresponding defect classification submodels are trained for the plurality groups of first-preset-category defects. This can enable the defect classification submodels to fully learn features of the corresponding group of first-preset-category defects to improve accuracy of extracting features. In addition, the defect classification submodels need only to precisely classify the corresponding group of first-preset-category defects and thus process a small amount of information, thereby making training and calculation of the defect classification model faster.

In some embodiments, the for each group of first sample images, using the group of first sample images to train a corresponding defect classification submodel so that a defect classification submodel obtained through training is capable of predicting a group of first-preset-category defects corresponding to the group of first sample image includes: for each first sample image in the group of first sample images, inputting the first sample image to the defect classification model to obtain a predicted defect classification result of the first sample image; and adjusting parameters of the defect classification submodel based on the first-preset-category defect and the predicted defect classification result of the first sample image. In this way, efficiency and accuracy of extracting features of the first-preset-category defects by the defect classification submodel can be improved.

In some embodiments, the for each group of first sample images, using the group of first sample images to train a corresponding defect classification submodel so that a defect classification submodel obtained through training is capable of predicting a group of first-preset-category defects corresponding to the group of first sample image further includes: in response to completion of training of the defect classification submodel, compressing the defect classification submodel to obtain a compressed defect classification submodel; and using the group of first sample images to train the compressed defect classification submodel so that a compressed defect classification submodel obtained through training is capable of predicting a group of first-preset-category defects corresponding to the group of first sample images. In the foregoing description, the defect classification submodel is compressed. This can change a structure of the defect classification submodel (such as a quantity of intermediate layers and parameters of the intermediate layers) and facilitate subsequent weighted calculation for each defect classification submodel without the need to select multiple defect classification submodels with a completely same structure for training.

In some embodiments, the for each group of first sample images, using the group of first sample images to train a corresponding defect classification submodel so that a defect classification submodel obtained through training is capable of predicting a group of first-preset-category defects corresponding to the group of first sample image further includes: obtaining a defect classification student model, where a quantity of a plurality of first intermediate layers of the defect classification student model is less than a quantity of a plurality of second intermediate layers of the defect classification submodel; dividing the plurality of second intermediate layers of the defect classification submodel into a plurality of second intermediate layer groups, where each second intermediate layer group includes at least one second intermediate layer sequentially connected, and the plurality of second intermediate layer groups are in one-to-one correspondence with the plurality of first intermediate layers; inputting a first sample image in the group of first sample images to the defect classification student model to obtain a sample feature vector output by each of the plurality of first intermediate layers of the defect classification student model; obtaining a sample feature vector output by each of the plurality of second intermediate layer groups of the defect classification submodel; adjusting parameters of the defect classification student model based on the sample feature vector output by each first intermediate layer and the sample feature vector output by each second intermediate layer group; and using an adjusted defect classification student model as the defect classification submodel. In the foregoing description, the defect classification submodel is compressed through knowledge distillation. This can change a structure of the defect classification submodel (such as a quantity of intermediate layers and parameters of the intermediate layers) and facilitate subsequent weighted calculation for each defect classification submodel without the need to select multiple defect classification submodels with a completely same structure for training.

In some embodiments, defect classification submodels obtained through training respectively using each of the plurality of groups of first sample images have the same quantity of intermediate layers. In the foregoing description, defect classification submodels with similar structures are trained. This facilitates subsequent weighted calculation for the defect classification submodels, thereby making training of the defect classification model faster.

In some embodiments, the determining parameters of the defect classification model based on parameters of a defect classification submodel obtained through training respectively using each of the plurality of groups of first sample images includes: performing weighted calculation on corresponding parameters of defect classification submodels trained using the groups of first sample images; and using parameters obtained through weighted calculation as the parameters of the defect classification model. In the foregoing description, the parameters of defect classification submodels are used as the parameters of the defect classification model after weighted calculation. In this way, the defect classification model can integrate advantages of the defect classification submodels, thereby improving the accuracy of extracting features of the first-preset-category defects by the defect classification model.

In some embodiments, the backbone model is obtained through training using a plurality of sample images including the plurality of first-preset-category defects and the second-preset-category defect. Therefore, the backbone model can be a pre-trained or existing model capable of classifying all defects, which reduces training of new models and avoids a waste of existing resources.

In some embodiments, the second-preset-category defect includes a plurality of sub-preset-category defects, and a similarity between image features of any two of the plurality of sub-preset-category defects is less than the preset threshold. After the defect classification model is trained, the defect detection model is adjusted using sample images having preset-category defects that are not similar to the used preset-category defects. This can increase a speed of training the defect detection model and reduce a calculation amount and costs while ensuring that the defect detection model can identify all defects.

In some embodiments, the plurality of first-preset-category defects and the second-preset-category defect are generated in a die-cutting process during cell production. Many types of defects occur in a cell die-cutting process and the defects have indistinguishable features. With the foregoing method, defects generated in the die-cutting process can be detected.

In some embodiments, the method further includes: in response to completion of training of the defect detection model, compressing the defect detection model to obtain a compressed defect detection model; and using the plurality of sample images including the plurality of first-preset-category defects and the second-preset-category defect to train the compressed defect detection model so that a compressed defect detection model obtained through training is capable of predicting the plurality of first-preset-category defects and the second-preset-category defect. The defect detection model obtained through training is compressed. This reduces a parameter storage amount and increases a calculation speed of the defect detection model.

According to a second aspect of this application, an embodiment provides a cell defect detection method, including: obtaining an image for inspection; inputting the image for inspection to a defect detection model to obtain a predicted defect classification result output by the defect detection model, where the defect detection model is obtained through training by performing a method for training a cell defect detection model according to this application; and determining, based on the predicted defect classification result, whether a defect exists in the image for inspection. This can make a feature extracted by a defect classification model for a first-preset-category defect more accurate, facilitating subsequent classification of a backbone model, and improving accuracy of detecting cell defects, especially the first-preset-category defect.

According to a third aspect of this application, an embodiment provides an apparatus for training a cell defect detection model, where the defect detection model includes a backbone model and a defect classification model with at least an output layer removed, and the method includes: a first obtaining unit, where the first obtaining unit is configured to obtain a plurality of first sample images, and the plurality of first sample images include sample images corresponding to a plurality of first-preset-category defects of a cell; a training unit, where the training unit is configured to use the plurality of first sample images to train a defect classification model that includes the output layer so that a defect classification model obtained through training is capable of predicting the plurality of first-preset-category defects of the cell; a second obtaining unit, where the second obtaining unit is configured to obtain a second sample image, and the second sample image includes a second-preset-category defect of the cell; a feature extraction unit, where the feature extraction unit is configured to input the second sample image to the defect classification model with at least an output layer removed to obtain a sample feature vector of the second sample image; a defect detection unit, where the defect detection unit is configured to input the sample feature vector of the second sample image to the backbone model to obtain a predicted defect classification result of the second sample image; and an adjustment unit, where the adjustment unit is configured to adjust, based on the second-preset-category defect and the predicted defect classification result of the second sample image, parameters of the backbone model and the defect classification model with at least an output layer removed. The solution in this embodiment can have the same technical effects as the foregoing corresponding method.

According to a fourth aspect of this application, an embodiment provides cell defect detection apparatus, including: a third obtaining unit, where the third obtaining unit is configured to obtain an image for inspection; a detection unit, where the detection unit is configured to input the image for inspection to a defect detection model to obtain a predicted defect classification result output by the defect detection model, and the defect detection model is obtained through training by performing a method for training a cell defect detection model according to this application; and a determining unit, where the determining unit is configured to determine, based on the predicted defect classification result, whether a defect exists in the image for inspection. The solution in this embodiment can have the same technical effects as the foregoing corresponding method.

According to a fifth aspect of this application, an embodiment provides an electronic device, including at least one processor and a memory communicatively connected to the at least one processor, where the memory stores instructions executable by the at least one processor, and when the instructions are executed by the at least one processor, the at least one processor is enabled to perform a method for training a cell defect detection model according to this application and/or a cell defect detection method according to this application.

According to a sixth aspect of this application, an embodiment provides a computer-readable storage medium storing computer instructions, where the computer instructions are configured to enable a computer to perform a method for training a cell defect detection model according to this application and/or a cell defect detection method according to this application.

According to a seventh aspect of this application, an embodiment provides a computer program product including a computer program, where when the computer program is executed by a processor, a method for training a cell defect detection model according to this application and/or a cell defect detection method according to this application are/is implemented.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

In the accompanying drawings, unless otherwise specified, the same reference signs in a plurality of drawings denote the same or similar components or elements. The accompanying drawings are not necessarily drawn to scale. It should be understood that these drawings depict only some implementations disclosed in this application and should not be considered as a limitation on a scope of this application.

FIG. 10 is a schematic flowchart of a method for training a cell defect detection model according to other embodiments of this application.

Figure 1:
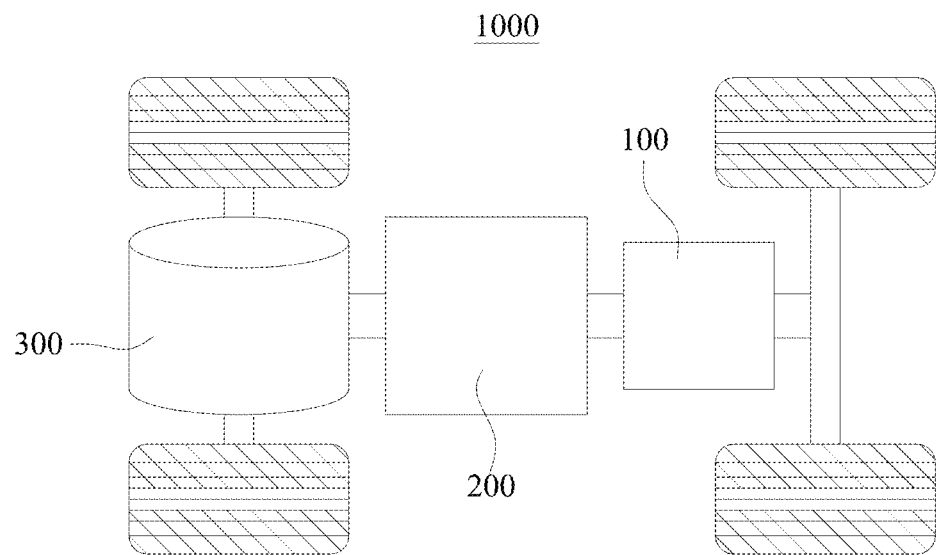
FIG. 1 is a schematic structural diagram of a vehicle according to some embodiments of this application.

Reference numerals in the accompanying drawings described as follows:

Vehicle 1000;
Battery 100, Controller 200, Motor 300;
Box 10, First portion 11, Second portion 12;
Battery cell 20, End cover 21, Housing 22, Electrode assembly 23;
Sample images 510 and 520, Wrinkle defect 511, and Spot defect 521.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims and the foregoing brief description of drawings of this application are intended to cover a non-exclusive inclusion.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the descriptions of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiment.

In the descriptions of embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in this application as appropriate to specific situations.

Currently, from a perspective of market development, application of electric vehicle batteries is becoming more and more extensive. Traction batteries have been widely used in energy storage power supply systems such as hydro-electric power plants, thermal power plants, wind power plants, and solar power plants, and many other fields including electric transportation tools such as electric bicycles, electric motorcycles, and electric vehicles, military equipment, and aerospace. With continuous expansion of application fields of traction batteries, market demands for the traction batteries are also expanding.

However, during production of a battery, various defects may be caused in various processes of the battery. For example, in a cell die-cutting process, almost 20 different defects may be caused, such as wrinkle defects, spot defects, and bump defects. Among these defects, there may be one or more pairs of defects with similar features.

The applicants have noted that in some cases, all sample images are simply input to a defect detection model for training. Accuracy of a defect detection model obtained through training using this method depends heavily on quality of the sample images input (such as a resolution and a signal-to-noise ratio).

The applicants have found through research that the accuracy of the defect detection model obtained through training using this method is not high. For some defects, especially defects with similar features or non-prominent features (such defects account for a small percentage), incorrect detection or missed detection is prone to occur. How a yield of cell production is improved has become an urgent technical problem to be resolved in the art.

Based on the above technical problems found, through in-depth research, the inventors provide a method and apparatus for training a cell defect detection model, a method and apparatus for cell defect detection, an electronic device, a computer-readable storage medium, and a computer program product, to improve a yield of cell production.

The solutions in embodiments of this application are applied in various cell production processes, for example, in a cell die-cutting process. The computer vision and deep learning technologies are used in the solutions in embodiments of this application. In an implementation solution of this application, a defect classification model is first trained for first-preset-category defects, and then a feature vector output by an intermediate layer of the defect classification model obtained through training is migrated to a backbone model. This not only makes a feature extracted by the defect classification model for the first-preset-category defects more accurate, facilitating subsequent classification of the backbone model, but also facilitates full use of existing model resources to avoid repeated training of new models. In this way, accuracy of the defect detection model in detecting cell defects, especially the first-preset-category defects, is improved. In addition, a speed for training the defect detection model is improved and training costs are reduced.

The solutions in embodiments of this application are applied in various production processes of electrode assemblies in various traction batteries or energy storage batteries, for example, in a cell die-cutting process.

For ease of description, an electric apparatus of an embodiment of the application being a vehicle 1000 is used as an example for description.

Referring to FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
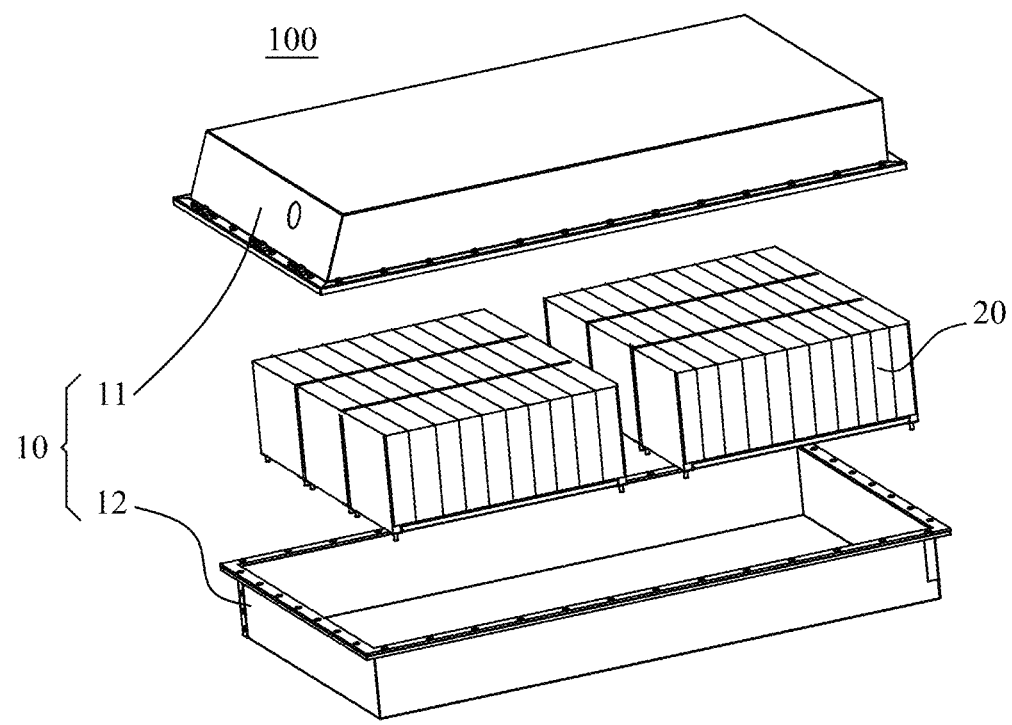
FIG. 2 is a schematic structural exploded view of a battery according to some embodiments of this application.

Referring to FIG. 2, FIG. 2 is an exploded view of a battery 100 according to some embodiments of this application. The battery 100 may include a box 10 and battery cells 20, where the battery cells 20 is accommodated in the box 10. The box 10 is configured to provide an accommodation space for the battery cells 20. In some embodiments, the box 10 may include a first portion 11 and a second portion 12. The first portion 11 and the second portion 12 fit together so that the first portion 11 and the second portion 12 jointly define a space for accommodating the battery cells 20.

The battery cell 20 may be a secondary battery or a primary battery, and may be a lithium-sulfur battery, a sodium-ion battery, or a magnesium-ion battery, without being limited thereto. The battery cell 20 may be cylindrical, flat, cuboid, or of other shapes.

Figure 3:
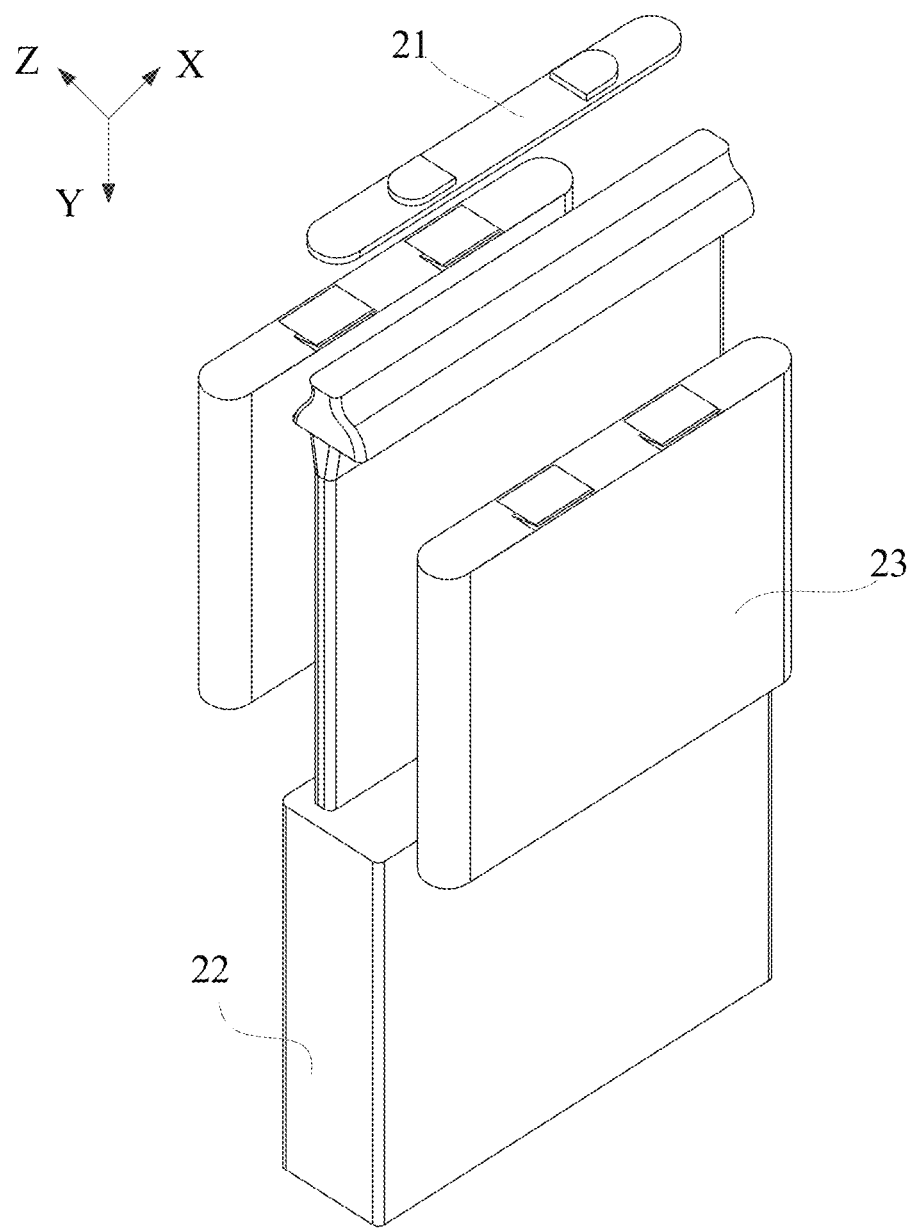
FIG. 3 is a schematic structural exploded view of a battery cell according to some embodiments of this application.

Referring to FIG. 3, FIG. 3 is a schematic structural exploded view of a battery cell 20 according to some embodiments of this application. The battery cell 20 refers to a smallest unit constituting a battery. As shown in FIG. 3, the battery cell 20 includes an end cover 21, a housing 22, an electrode assembly 23 (also referred to as a cell hereinafter), and other functional components.

The end cover 21 refers to a component that covers an opening of the housing 22 to isolate an internal environment of the battery cell 20 from an external environment. A shape of the end cover 21 is not limited and may be adapted to a shape of the housing 22 to fit the housing 22. The housing 22 is an assembly configured to form an internal environment of the battery cells 20 together with the end cover 21, where the formed internal environment may be configured to accommodate the electrode assembly 23, an electrolyte, and other components.

The electrode assembly 23 is a component in the battery cell 20 in which electrochemical reactions occur. The housing 22 may include one or more electrode assemblies 23. The electrode assembly 23 is mainly formed by winding or laminating a positive-electrode plate and a negative-electrode plate, and a separator is generally provided between the positive-electrode plate and the negative-electrode plate.

Figure 4:
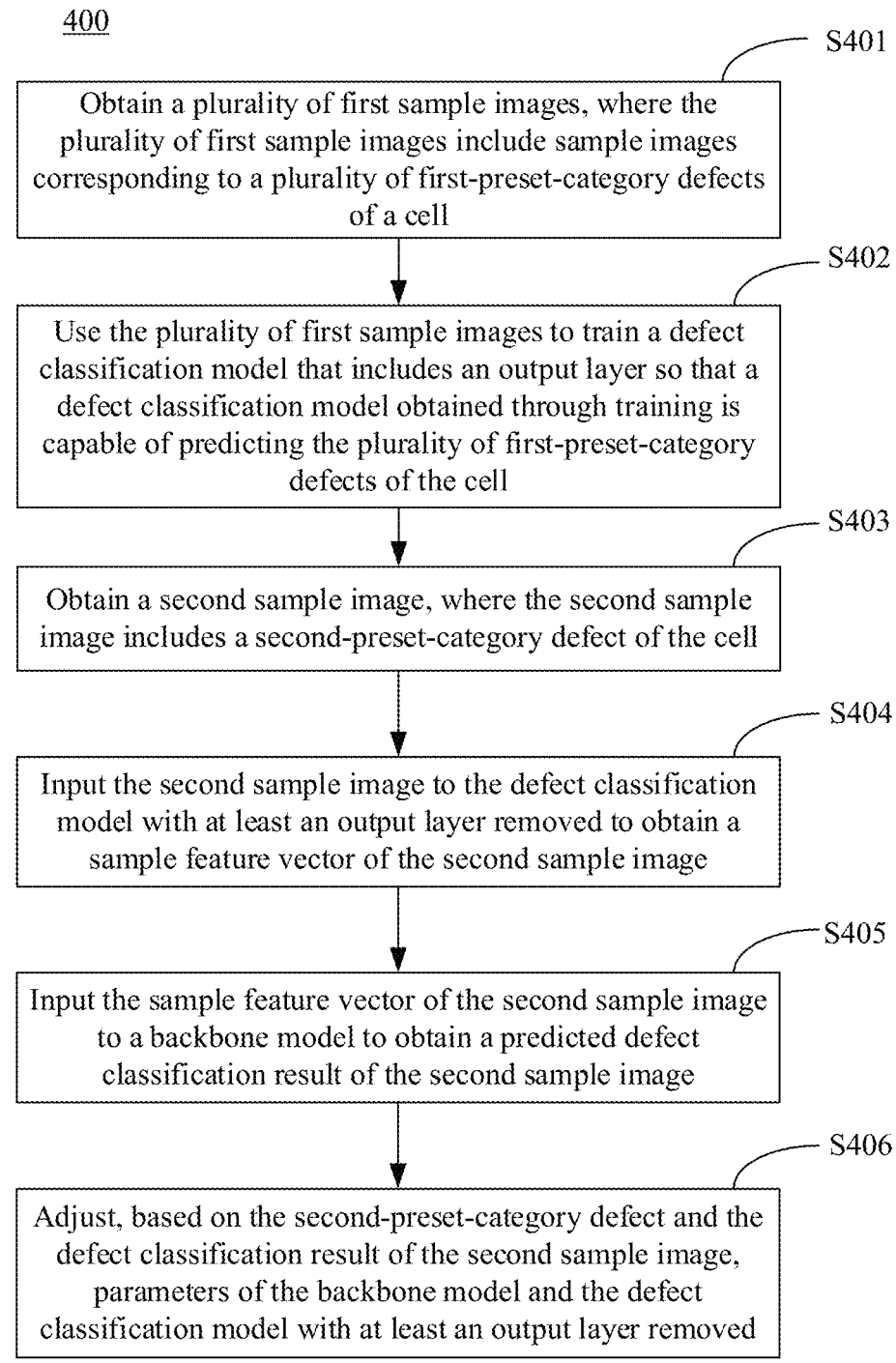
FIG. 4 is a schematic flowchart of a method for training a cell defect detection model according to some embodiments of this application.

As shown in FIG. 4, a method 400 for training a cell (for example, an electrode assembly 23 as shown in FIG. 3) defect detection model according to some embodiments of this application may include the following steps S401 to S406.

In step S401, a plurality of first sample images are obtained, where the plurality of first sample images include sample images corresponding to a plurality of first-preset-category defects of a cell.

In step S402, the plurality of first sample images are used to train a defect classification model that includes an output layer so that a defect classification model obtained through training is capable of predicting the plurality of first-preset-category defects of the cell.

In step S403, a second sample image is obtained, where the second sample image includes a second-preset-category defect of the cell.

In step S404, the second sample image is input to the defect classification model with at least an output layer removed to obtain a sample feature vector of the second sample image.

In step S405, the sample feature vector of the second sample image is input to a backbone model to obtain a predicted defect classification result of the second sample image.

In step S406, parameters of the backbone model and the defect classification model with at least an output layer removed are adjusted based on the second-preset-category defect and the predicted defect classification result of the second sample image.

The first and second sample images can be collected using an industrial camera in a specific process (for example, a die-cutting process) during cell production. The industrial camera may be a CCD industrial camera or a CMOS industrial camera. For another example, the industrial camera may be a line scan camera or an area scan camera.

Figure 5:
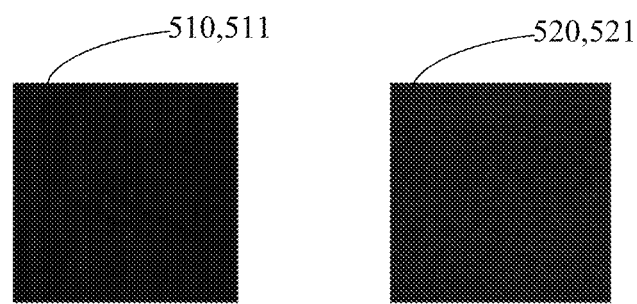
FIG. 5 is a schematic diagram of cell defects according to some embodiments of this application.

The plurality of first-preset-category defects may be a plurality of preset-category defects with similar forms and features, for example, wrinkle defects and spot defects. FIG. 5 shows a wrinkle defect 511 in a sample image 510 and a spot defect 521 in a sample image 520. It should be understood that the plurality of first-preset-category defects may also be a plurality of preset-category defects that need defect features to be accurately extracted and that have other characteristics. This is not limited in this application.

The second-preset-category defect may be a preset-category defect different from the first-preset-category defect, for example, a preset-category defect with a feature not similar as that of the first-preset-category defect. In addition, features of various sub-preset-category defects in the second-preset-category defect may be not similar with each other and distinguishable. This is not limited in this application.

The defect classification model may be a deep learning model, for example, ResNet18, ResNet50, and DNN, or a traditional machine learning model. This is not limited in this application. The defect classification model may include an input layer, a plurality of intermediate layers, and an output layer. The input layer is used for inputting sample images, the plurality of intermediate layers are used for extracting a feature vector from a sample image, and the output layer is used for outputting a classification result based on the extracted feature vector. Parameters of the defect classification model are configuration variables in a model, such as a weight and an offset in a neural network model.

The backbone model may be a Softmax function or the like and is used for classification based on the feature vector input. The predicted defect classification result output by the backbone model may include a defect confidence corresponding to each sample image, for example, a probability value ranging from 0 to 1. The parameters of the backbone model may be various parameters of a function.

Figure 6:
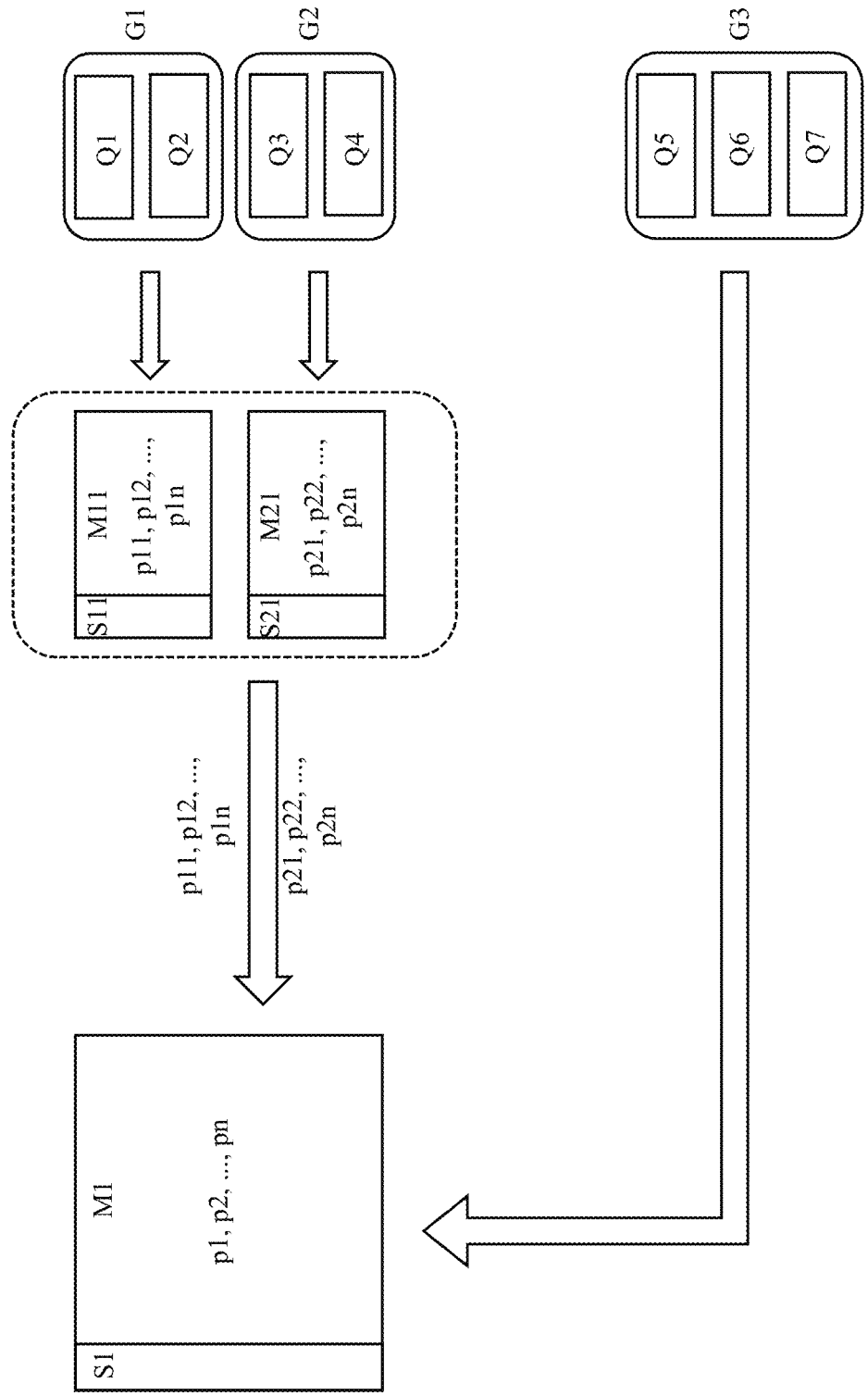
FIG. 6 is a schematic diagram of a defect detection model according to some embodiments of this application.

As shown in FIG. 6, the defect detection model includes a defect classification model M1 with at least an output layer removed and a backbone model S1, to migrate a feature vector output by an intermediate layer of the defect classification model to the backbone model, improving accuracy and speed of classifying the first-preset-category defects by the backbone model.

The defect classification model including an output layer is a complete defect classification model and the defect classification model with at least an output layer removed is a defect classification model with an output layer removed or a defect classification model with an output layer and the last (two, three, or the like) intermediate layer removed.

The training method 400 may be executed on a server or client device. The server may include one or more general-purpose computers, dedicated server computers (for example, PC (personal computer) servers, UNIX servers, and midrange servers), blade servers, mainframe computers, server clusters, or any other suitable arrangements and/or combinations. In some implementations, the server may be a server of a distributed system, a server combined with a block chain, a cloud server, an intelligent cloud computing server or intelligent cloud host with artificial intelligence technology. The client device may include various types of computer devices, for example, portable hand-held devices, general-purpose computers (such as personal computers and laptop computers), or workstation computers.

The foregoing embodiment not only makes a feature extracted by the defect classification model for the first-preset-category defects more accurate, facilitating subsequent classification of the backbone model, but also facilitates full use of existing model resources to avoid repeated training of new models. In this way, accuracy of the defect detection model in detecting defects, especially the first-preset-category defects, is improved. In addition, a speed for training the defect detection model is improved and training costs are reduced.

In some embodiments of this application, the plurality of first-preset-category defects include at least one group of first-preset-category defects, each group of first-preset-category defects includes a plurality of first-preset-category defects, and similarities between image features of the first-preset-category defects in each group of first-preset-category defects are not less than a preset threshold.

In other words, the plurality of first-preset-category defects in each of the at least one group of first-preset-category defects may be a plurality of preset-category defects with similar forms and features, for example, wrinkle defects and spot defects. FIG. 5 shows a wrinkle defect 511 in a sample image 510 and a spot defect 521 in a sample image 520. The preset threshold may be determined based on experience or a specification requirement in a battery production process.

In the foregoing description, the defect classification model is pre-trained for similar first-preset-category defects. This enables the defect classification model to learn features of similar defects to improve accuracy of extracting the features of similar defects. In addition, the defect classification model needs only to precisely classify the first-preset-category defects and thus processes a small amount of information, thereby making training and calculation of the defect classification model faster.

In some embodiments of this application, a similarity between an image feature of the second-preset-category defect and an image feature of any one of the plurality of first-preset-category defects is less than the preset threshold.

In other words, the second-preset-category defect may be a preset-category defect different from the first-preset-category defect, for example, a preset-category defect with a feature not similar as that of the first-preset-category defect.

In the foregoing description, the entire defect detection model is adjusted based on the second-preset-category defect that is different from the first-preset-category defects so that the defect detection model can well identify the first-preset-category defects and the second-preset-category defect.

In some embodiments of this application, step S402 in which a plurality of first sample images are used to train a defect classification model that includes an output layer so that a defect classification model obtained through training is capable of predicting a plurality of first-preset-category defects of a cell includes: for each of the plurality of first sample images, inputting the first sample image to the defect classification model that includes the output layer to obtain a predicted defect classification result of the first sample image; and adjusting parameters of the defect classification model based on the first-preset-category defect and the predicted defect classification result of the first sample image.

In other words, a defect classification model may be pre-trained for the plurality of first-preset-category defects so that the defect classification model can classify the first-preset-category defects. In addition, if the at least one group of first-preset-category defects includes only group of first-preset-category defects (a plurality first-preset-category defects are similar), a defect classification model is pre-trained for the plurality of similar first-preset-category defects so that the defect classification model can well distinguish the group of similar defects.

In some examples, parameters of the defect classification model can be continuously adjusted using a gradient descent method based on the first-preset-category defects and the predicted defect classification result to minimize a loss function of the defect classification model.

In the foregoing description, a simple method is used to train the defect classification model for the first-preset-category defects to improve accuracy and efficiency of the defect classification model obtained through training.

In some embodiments of this application, the plurality of first sample images include a plurality of groups of first sample images, the at least one group of first-preset-category defects includes a plurality of groups of first-preset-category defects, and a cell defect category in each group of first sample images pertains to a group of first-preset-category defects in one-to-one correspondence with the group of first sample images. Step 402 in which a plurality of first sample images are used to train a defect classification model that includes an output layer so that a defect classification model obtained through training is capable of predicting a plurality of first-preset-category defects of a cell may include: for each group of first sample images, using the group of first sample images to train a corresponding defect classification submodel so that a defect classification submodel obtained through training is capable of predicting a group of first-preset-category defects corresponding to the group of first sample images; and determining parameters of the defect classification model based on parameters of a defect classification submodel obtained through training respectively using each of the plurality of groups of first sample images.

In other words, when the at least one group of first-preset-category defects includes a plurality of groups of first-preset-category defects (for example, a plurality of groups of similar defects), a defect classification submodel can be pre-trained for each of the plurality of groups of first-preset-category defects. The defect classification submodel may have a structure the same as (for example, with the same quantity of intermediate layers and parameters of corresponding intermediate layers corresponding to each other) or different from that of the defect classification model.

Parameters of the defect classification model are configuration variables in a model, such as a weight and an offset in a neural network model. Parameters of the defect classification submodel specifically refer to parameters (that is, weight and offset) of the intermediate layers of the defect classification submodel. Similarly, the parameters of the defect classification model refer to parameters (that is, weight and offset) of the intermediate layers of the defect classification model. The defect detection model includes only the defect classification model with an output layer removed. Therefore, the parameters of the intermediate layers of the defect classification model need only to be determined.

As shown in FIG. 6, a plurality of groups of first sample images include a group of first sample images G1 and another group of first sample images G2. The group of first sample images G1 includes a group of first-preset-category defects Q1 and Q2, and the another group of first sample images G2 includes a group of first-preset-category defects Q3 and Q4. The group of first sample images G1 is used as an example. The group of first sample images G1 is used to train a corresponding defect classification submodel M11 including an output layer S11 so that a defect classification submodel M11 obtained through training is capable of predicting the group of first-preset-category defects Q1 and Q2. Similarly, the group of first sample images G2 is used to train a defect classification submodel M21 including an output layer S21. Then, parameters of a defect classification model M1 (p1, p2, . . . , and pn) are determined based on parameters of the defect classification models M11 and M21 (p11, p12, . . . , and p1n; p21, p22, . . . , and p2n). In this way, a new defect classification model with at least an output layer removed can be constructed based on parameters of plurality of pre-trained defect classification submodels.

In the foregoing description, corresponding defect classification submodels are trained for a plurality of groups of first-preset-category defects. This can enable the defect classification submodels to fully learn features of the corresponding group of first-preset-category defects to improve accuracy of extracting features. In addition, the defect classification submodels need only to precisely classify the corresponding group of first-preset-category defects and thus process a small amount of information, thereby making training and calculation of the defect classification model faster.

In some embodiments of this application, that for each group of first sample images, the group of first sample images is used to train a corresponding defect classification submodel so that a defect classification submodel obtained through training is capable of predicting a group of first-preset-category defects corresponding to the group of first sample image includes: for each first sample image in the group of first sample images, inputting the first sample image to the defect classification submodel to obtain a predicted defect classification result of the first sample image; and adjusting parameters of the defect classification submodel based on the first-preset-category defect and the predicted defect classification result of the first sample image.

In some examples, parameters of the defect classification submodel can be continuously adjusted using a gradient descent method based on the first-preset-category defects and the predicted defect classification result to minimize a loss function of the defect classification submodel.

In this way, efficiency and accuracy of extracting features of the first-preset-category defects by the defect classification submodel can be improved.

In some embodiments of this application, the for each group of first sample images, using the group of first sample images to train a corresponding defect classification submodel so that a defect classification submodel obtained through training is capable of predicting a group of first-preset-category defects corresponding to the group of first sample image further includes: in response to completion of training of the defect classification submodel, compressing the defect classification submodel to obtain a compressed defect classification submodel; and using the group of first sample images to train the compressed defect classification submodel so that a compressed defect classification submodel obtained through training is capable of predicting a group of first-preset-category defects corresponding to the group of first sample images.

When a plurality of defect classification submodels include defect classification submodels with different model structures, a defect classification submodel with a complicated model structure can be compressed by using a method such as pruning and quantizing so that the compressed defect classification submodel can have a structure the same as (for example, with the same quantity of intermediate layers and parameters of corresponding intermediate layers corresponding to each other) or similar with (for example, with the same quantity of intermediate layers) those of other defect classification submodels. In some examples, the defect classification submodel can be compressed by using an existing pruning or quantizing algorithm.

In the foregoing description, the defect classification submodel is compressed. This can change a structure of the defect classification submodel (such as a quantity of intermediate layers and parameters of the intermediate layers) and facilitate subsequent weighted calculation for the defect classification submodel without the need to select multiple defect classification submodels with a completely same structure for training.

In some embodiments of this application, the for each group of first sample images, using the group of first sample images to train a corresponding defect classification submodel so that a defect classification submodel obtained through training is capable of predicting a group of first-preset-category defects corresponding to the group of first sample image may further include: obtaining a defect classification student model, where a quantity of a plurality of first intermediate layers of the defect classification student model is less than a quantity of a plurality of second intermediate layers of the defect classification submodel; dividing the plurality of second intermediate layers of the defect classification submodel into a plurality of second intermediate layer groups, where each second intermediate layer group includes at least one second intermediate layer sequentially connected, and the plurality of second intermediate layer groups are in one-to-one correspondence with the plurality of first intermediate layers; inputting a first sample image in the group of first sample images to the defect classification student model to obtain a sample feature vector output by each of the plurality of first intermediate layers of the defect classification student model; obtaining a sample feature vector output by each of the plurality of second intermediate layer groups of the defect classification submodel; adjusting parameters of the defect classification student model based on the sample feature vector output by each first intermediate layer and the sample feature vector output by each second intermediate layer group; and using an adjusted defect classification student model as the defect classification submodel.

When a plurality of defect classification submodels include defect classification submodels with different model structures, a defect classification submodel with a complicated model structure can be compressed through knowledge distillation so that the compressed defect classification submodel can have a structure the same as or similar with those of other defect classification submodels. A model structure of the defect classification student model may be the same as structures of other defect classification submodels. In this case, intermediate layers of the trained defect classification submodel with a complicated model structure are grouped so that a plurality of intermediate layer groups of the defect classification submodel are in one-to-one correspondence with a plurality of intermediate layers of the defect classification student model. Alternatively, the model structure of the defect classification student model may be different from the structures of other defect classification submodels. In this case, the intermediate layers of the trained defect classification submodel with a complicated model structure and intermediate layers of the defect classification student model can be grouped at the same time so that a plurality of intermediate layer groups of the defect classification student model are in one-to-one correspondence with a plurality of intermediate layer groups of the defect classification submodel.

The adjusting parameters of the defect classification student model based on the sample feature vector output by each first intermediate layer and the sample feature vector output by each second intermediate layer group may include: calculating distillation loss based on the sample feature vector output by each first intermediate layer and the sample feature vector output by each second intermediate layer group, and adjusting the parameters of the defect classification student model based on the distillation loss calculated.

In the foregoing description, the defect classification submodel is compressed through knowledge distillation. This can change a structure of the defect classification submodel (such as a quantity of intermediate layers and parameters of the intermediate layers) and facilitate subsequent weighted calculation for each defect classification submodel without the need to select multiple defect classification submodels with a completely same structure for training.

In some embodiments of this application, defect classification submodels obtained through training respectively using each of the plurality of groups of first sample images have the same quantity of intermediate layers.

In other words, a plurality of defect classification submodels with similar model structures can be set up for the plurality of groups of first-preset-category defects.

In the foregoing description, defect classification submodels with similar model structures are trained. This facilitates subsequent weighted calculation for the defect classification submodels, thereby making training of the defect detection model faster.

In some embodiments of this application, the determining parameters of the defect classification model based on parameters of a defect classification submodel obtained through training respectively using each of the plurality of groups of first sample images may include: performing weighted calculation on corresponding parameters of defect classification submodels trained using the groups of first sample images; and using parameters obtained through weighted calculation as the parameters of the defect classification model.

A defect detection model shown in FIG. 6 is used as an example. Weighted calculation is performed on corresponding parameters ($p_{11}, p_{12}, \ldots,$ and $p_{1n}$; $p_{21}, p_{22}, \ldots,$ and $p_{2n}$) of defect classification submodels M11 and M21 that are obtained through training respectively using each of groups of first sample images G1 and G2, to determine parameters of a defect classification model M1 ($p_1, p_2, \ldots,$ and $p_n$). For example, $p_1 = k_{11}p_{11} + k_{12}p_{21}$, $p_2 = k_{21}p_{12} + k_{22}p_{22}, \ldots, p_n = k_{n1}p_{1n} + k_{n2}p_{2n}$. $k_{11}, k_{12}, k_{21}, k_{22}, \ldots, k_{n1},$ and $k_{n2}$ are weights of the parameters, which can be manually set based on experience. Alternatively, simple averaging can be performed on the corresponding parameters of defect classification submodels trained using the groups of first sample images for use as parameters of the defect classification model.

In the foregoing description, the parameters of defect classification submodels are used as the parameters of the defect classification model after weighted calculation. In this way, the defect classification model can integrate advantages of the defect classification submodels, thereby improving the accuracy of extracting features of the first-preset-category defects by the defect classification model.

In some embodiments of this application, the backbone model is obtained through training using a plurality of sample images including the plurality of first-preset-category defects and the second-preset-category defect.

Therefore, the backbone model can be a pre-trained or existing model capable of classifying all defects, which can reduce training of new models and avoid a waste of existing resources.

In some embodiments of this application, the second-preset-category defect includes a plurality of sub-preset-category defects, and a similarity between image features of any two of the plurality of sub-preset-category defects is less than the preset threshold.

In other words, a plurality of sub-preset-category defects of the second-preset-category defect are not similar with each other. The defect detection model can easily extract features of defects that are not similar with each other (with prominent features). Therefore, after the defect classification model is trained, these dissimilar features can be used to adjust parameters of the defect detection model so that the defect detection model is capable of identifying all defects.

As shown in FIG. 5, the second-preset-category defect includes a plurality of sub-preset-category defects Q5, Q6, and Q7. The plurality of sub-preset-category defects Q5, Q6, and Q7 are not similar with each other. In steps S404 to S406, a second sample image G3 including a plurality of sub-preset-category defects Q5, Q6, and Q7 is input to the defect detection model including a defect classification model M1 with at least an output layer removed and a backbone model S1, and parameters (p1, p2, . . . , and pn) of the defect classification model M1 with at least an output layer removed and parameters of the backbone model S1 are adjusted based on a predicted defect classification result output by the backbone model S1 and a second-preset-category defect.

After the defect classification model is trained, the defect detection model is adjusted using sample images having preset-category defects that are not similar to the used preset-category defects. This can increase a speed of training the defect detection model and reduce a calculation amount and costs while ensuring that the defect detection model can identify all defects.

In some embodiments of this application, the plurality of first-preset-category defects and the second-preset-category defect are generated in a die-cutting process during cell production.

Many types of defects occur in a cell die-cutting process and the defects have indistinguishable features. With the foregoing method, defects generated in the die-cutting process can be detected.

In some embodiments of this application, the method 400 further includes: in response to completion of training of the defect detection model, compressing the defect detection model to obtain a compressed defect detection model; and using the plurality of sample images including the plurality of first-preset-category defects and the second-preset-category defect to train the compressed defect detection model so that a compressed defect detection model obtained through training is capable of predicting the plurality of first-preset-category defects and the second-preset-category defect.

In other words, the trained defect detection model can be compressed by using a method such as pruning and quantizing. In some examples, the defect detection model can be compressed by using an existing pruning or quantizing algorithm. Alternatively, the trained defect detection model can be compressed through knowledge distillation.

In the foregoing description, the defect detection model obtained through training is compressed. This reduces a parameter storage amount and increases a calculation speed of the defect detection model.

Figure 7:
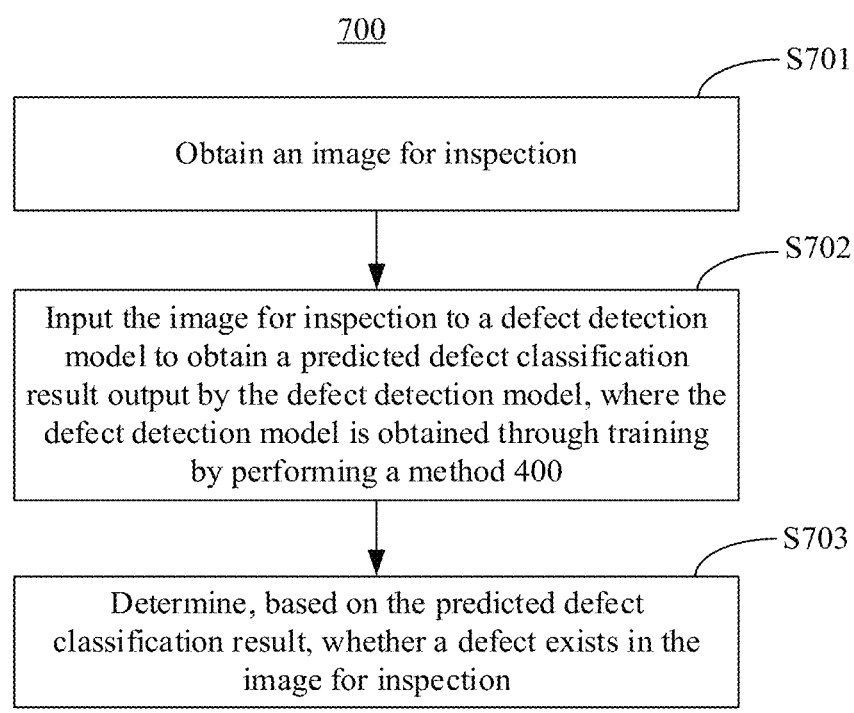
FIG. 7 is a schematic flowchart of a cell defect detection method according to some embodiments of this application.

As shown in FIG. 7, some embodiments of this application provide a cell defect detection method 700. The method may include: step S701: Obtain an image for inspection; step S702: Input the image for inspection to a defect detection model to obtain a predicted defect classification result output by the defect detection model, where the defect detection model is obtained through training by performing the foregoing method 400; and step S703: Determine, based on the predicted defect classification result, whether a defect exists in the image for inspection.

A method for obtaining the image for inspection is the same as a method for obtaining a sample image in method 400. Details are not described here.

The method 700 may be executed on a server or client device. The server includes one or more general-purpose computers, dedicated server computers (for example, PC (personal computer) servers, UNIX servers, and midrange servers), blade servers, mainframe computers, server clusters, or any other suitable arrangements and/or combinations. In some implementations, the server may be a server of a distributed system, a server combined with a block chain, a cloud server, an intelligent cloud computing server or intelligent cloud host with artificial intelligence technology. The client device may include various types of computer devices, for example, portable hand-held devices, general-purpose computers (such as personal computers and laptop computers), or workstation computers. Alternatively, the method 700 may be executed on an industrial computer equipped with a chip in a cell production line. The chip may be a system on chip (System on Chip, SoC) or the like.

This not only makes a feature extracted by the defect classification model for the first-preset-category defects more accurate, facilitating subsequent classification of the backbone model, but also facilitates full use of existing model resources to avoid repeated training of new models. In this way, accuracy and efficiency in detecting defects, especially the first-preset-category defects, are improved.

Figure 8:
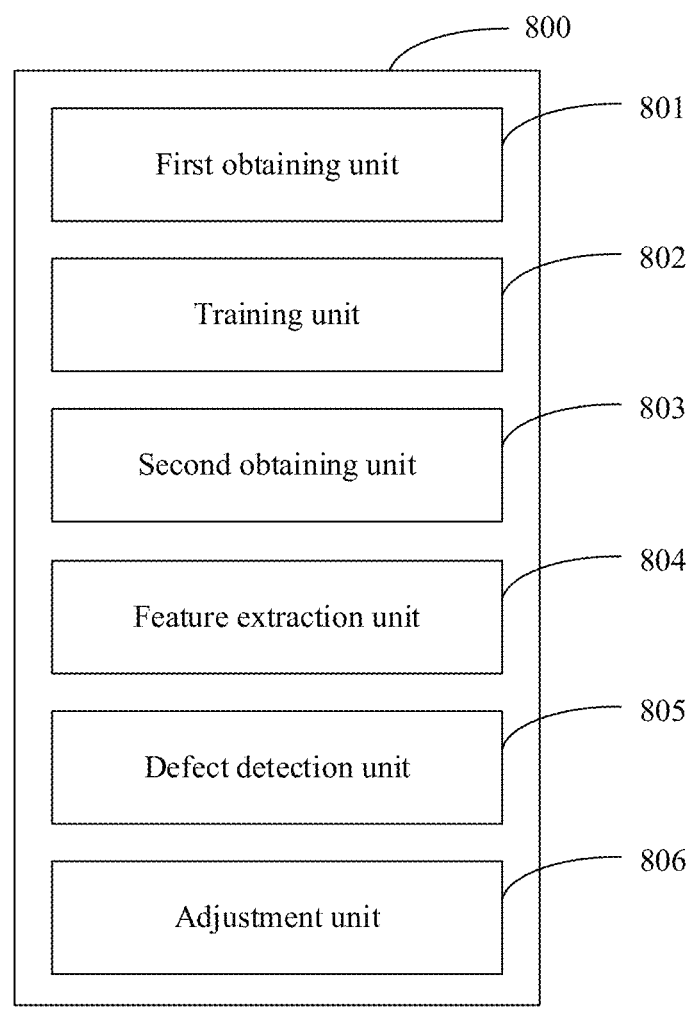
FIG. 8 is a structural block diagram of an apparatus for training a cell defect detection model according to some embodiments of this application.

As shown in FIG. 8, some embodiments of this application provide an apparatus 800 for training a cell defect detection model. The defect detection model includes a backbone model and a defect classification model with at least an output layer removed. The apparatus 800 may include: a first obtaining unit 801, a training unit 802, a second obtaining unit 803, a feature extraction unit 804, a defect detection unit 805, and an adjustment unit 806. The first obtaining unit 801 is configured to obtain a plurality of first sample images, and the plurality of first sample images include sample images corresponding to a plurality of first-preset-category defects of a cell. The training unit 802 is configured to use the plurality of first sample images to train a defect classification model that includes an output layer so that a defect classification model obtained through training is capable of predicting the plurality of first-preset-category defects of the cell. The second obtaining unit 803 is configured to obtain a second sample image, and the second sample image includes a second-preset-category defect of the cell. The feature extraction unit 804 is configured to input the second sample image to the defect classification model with at least an output layer removed to obtain a sample feature vector of the second sample image. The defect detection unit 805 is configured to input the sample feature vector of the second sample image to the backbone model to obtain a predicted defect classification result of the second sample image. The adjustment unit 806 is configured to adjust, based on the second-preset-category defect and the predicted defect classification result of the second sample image, parameters of the backbone model and the defect classification model with at least an output layer removed.

It should be understood that the modules of the apparatus 800 shown in FIG. 8 may correspond to the steps of the method 400 described in FIG. 4. Therefore, operations, features, and advantages described for the method 400 are also applicable to the apparatus 800 and its modules. For brevity, some operations, features, and advantages are not described herein again.

The foregoing embodiment not only makes a feature extracted by the defect classification model for the first-preset-category defects more accurate, facilitating subsequent classification of the backbone model, but also facilitates full use of existing model resources to avoid repeated training of new models. In this way, accuracy of the defect detection model in detecting defects, especially the first-preset-category defects, is improved. In addition, a speed for training the defect detection model is improved and training costs are reduced.

Figure 9:
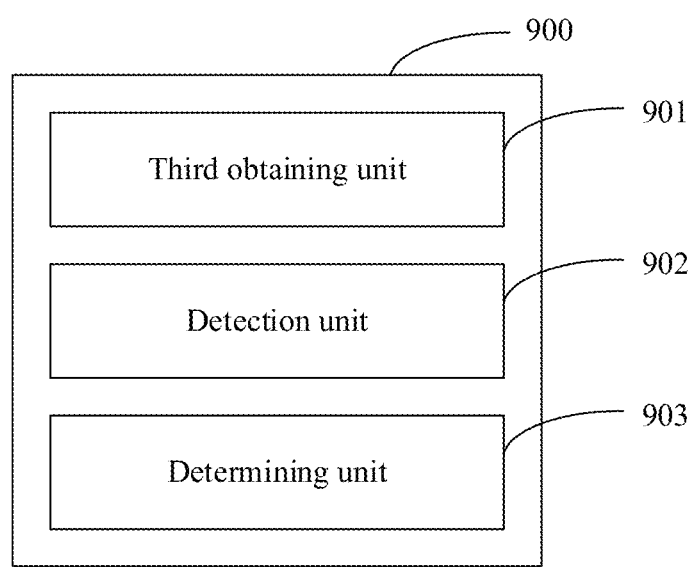
FIG. 9 is a structural block diagram of a cell defect detection method according to some embodiments of this application.

As shown in FIG. 9, some embodiments of this application provide a cell defect detection apparatus 900, including: a third obtaining unit 901, a detection unit 902, and a determining unit 903. The third obtaining unit 901 is configured to obtain an image for inspection. The detection unit 902 is configured to input the image for inspection to a defect detection model to obtain a predicted defect classification result output by the defect detection model, and the defect detection model is obtained through training by performing the method 400. The determining unit 903 is configured to determine, based on the predicted defect classification result, whether a defect exists in the image for inspection.

It should be understood that the modules of the apparatus 900 shown in FIG. 9 correspond to the steps of the method 700 described in FIG. 7. Therefore, operations, features, and advantages described for the method 700 are also applicable to the apparatus 700 and its modules. For brevity, some operations, features, and advantages are not described herein again.

This makes a feature extracted by the defect classification model for the first-preset-category defects more accurate, facilitating subsequent classification of the backbone model, and also facilitates full use of existing model resources to avoid repeated training of new models. In this way, accuracy and efficiency in detecting defects, especially the first-preset-category defects, are improved.

An embodiment of this application provides an electronic device, including at least one processor and a memory communicatively connected to the at least one processor, where the memory stores instructions executable by the at least one processor, and when the instructions are executed by the at least one processor, the at least one processor is enabled to perform the foregoing training method 400 and/or the foregoing method 700.

An embodiment of this application provides a computer-readable storage medium storing computer instructions, where the computer instructions are configured to enable a computer to perform the training method 400 and/or the method 700.

An embodiment of this application provides a computer program product including a computer program, where when the computer program is executed by a processor, the training method 400 and/or the method 700 are/is implemented.

As shown in FIG. 10, a training method 1000 for a cell defect detection model according to some embodiments of this application includes the following steps S1001 to S1011.

In step S1001, a plurality of first sample images are obtained. The plurality of first sample images include sample images corresponding to a plurality of first-preset-category defects of a cell, and the plurality of first sample images include a plurality of groups of first sample images. At least one group of first-preset-category defects includes a plurality of groups of first-preset-category defects, and a cell defect category in each group of first sample images pertains to a group of first-preset-category defects in one-to-one correspondence with the group of first sample images.

In step S1002, for each group of first sample images, the group of first sample images is used to train a corresponding defect classification submodel so that a defect classification submodel obtained through training is capable of predicting a group of first-preset-category defects corresponding to the group of first sample images.

In step S1003, weighted calculation is performed on corresponding parameters of defect classification submodels trained using the groups of first sample images.

In step S1004, parameters obtained through weighted calculation are used as the parameters of the defect classification model.

In step S1005, a second sample image is obtained, where the second sample image includes a second-preset-category defect of the cell.

In step S1006, the second sample image is input to the defect classification model with at least an output layer removed to obtain a sample feature vector of the second sample image.

In step S1007, the sample feature vector of the second sample image is input to a backbone model to obtain a predicted defect classification result of the second sample image.

In step S1008, parameters of the backbone model and the defect classification model with at least an output layer removed are adjusted based on the second-preset-category defect and the predicted defect classification result of the second sample image.

The steps of the foregoing method 1000 have the same features as the corresponding steps of the method 400. For brevity, details are not described herein again.

The method 1000 in this embodiment of this application not only makes a feature extracted by the defect classification model for the first-preset-category defects more accurate, facilitating subsequent classification of the backbone model, but also facilitates full use of existing model resources to avoid repeated training of new models. In this way, accuracy of the defect detection model in detecting defects, especially the first-preset-category defects, is improved. In addition, a speed for training the defect detection model is improved and training costs are reduced.

In conclusion, it should be noted that the above embodiments are merely intended for describing the technical solutions of this application but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. They should all be covered in the scope of claims and summary in this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A method for training a cell defect detection model, the defect detection model comprising a backbone model and a defect classification model with at least an output layer removed, the method comprising:
   obtaining a plurality of first sample images, wherein the plurality of first sample images comprise sample images corresponding to a plurality of first-preset-category defects of a cell;
   training a defect classification model that comprises the output layer using the plurality of first sample images, so that a defect classification model obtained through training is capable of predicting the plurality of first-preset-category defects of the cell;
   obtaining a second sample image, wherein the second sample image comprises a second-preset-category defect of the cell;
   inputting the second sample image to the defect classification model with at least the output layer removed to obtain a sample feature vector of the second sample image;
   inputting the sample feature vector of the second sample image to the backbone model to obtain a predicted defect classification result of the second sample image; and
   adjusting, based on the second-preset-category defect and the predicted defect classification result of the second sample image, parameters of the backbone model and the defect classification model with at least the output layer removed.

2. The method according to claim 1, wherein the plurality of first-preset-category defects comprise at least one group of first-preset-category defects, each group of first-preset-category defects comprises two or more first-preset-category defects of the plurality of first-preset-category defects, and similarities between image features of the two or more first-preset-category defects in each group of first-preset-category defects are not less than a preset threshold.

3. The method according to claim 1, wherein a similarity between an image feature of the second-preset-category defect and an image feature of any one of the plurality of first-preset-category defects is less than a preset threshold.

4. The method according to claim 1, wherein training the defect classification model that comprises the output layer using the plurality of first sample images comprises, for each of the plurality of first sample images:
   inputting the first sample image to the defect classification model that comprises the output layer to obtain a predicted defect classification result of the first sample image; and
   adjusting parameters of the defect classification model based on the first-preset-category defect and the predicted defect classification result of the first sample image.

5. The method according to claim 1, wherein:
   the plurality of first sample images comprise a plurality of groups of first sample images, the plurality of first-preset-category defects comprise a plurality of groups of first-preset-category defects, and a cell defect category in each group of first sample images pertains to one of the plurality of groups of first-preset-category defects in a one-to-one correspondence; and
   training the defect classification model that comprises the output layer using the plurality of first ample images comprises:
     for each group of first sample images, training a corresponding defect classification submodel using the group of first sample images so that a defect classification submodel obtained through training is capable of predicting one of the plurality of groups of first-preset-category defects corresponding to the group of first sample images; and
     determining parameters of the defect classification model based on parameters of the defect classification submodels obtained through training using the plurality of groups of first sample images.

6. The method according to claim 5, wherein for each group of first sample images, training the corresponding defect classification submodel using the group of first sample images comprises, for each first sample image in the group of first sample images:
   inputting the first sample image to the defect classification submodel to obtain a predicted defect classification result of the first sample image; and
   adjusting the parameters of the defect classification submodel based on the first-preset-category defect and the predicted defect classification result of the first sample image.

7. The method according to claim 6, wherein for each group of first sample images, training the corresponding defect classification submodel using the group of first sample images further comprises:
   in response to completion of training of the defect classification submodel, compressing the defect classification submodel to obtain a compressed defect classification submodel; and
   training the compressed defect classification submodel using the group of first sample images so that a compressed defect classification submodel obtained through training is capable of predicting the one of the plurality of groups of first-preset-category defects corresponding to the group of first sample images.

8. The method according to claim 6, wherein for each group of first sample images, training the corresponding defect classification submodel using the group of first sample images further comprises:
   obtaining a defect classification student model, wherein a quantity of a plurality of first intermediate layers of the defect classification student model is less than a quantity of a plurality of second intermediate layers of the defect classification submodel;
   dividing the plurality of second intermediate layers of the defect classification submodel into a plurality of second intermediate layer groups, wherein each second intermediate layer group comprises at least one second intermediate layer sequentially connected, and the plurality of second intermediate layer groups are in one-to-one correspondence with the plurality of first intermediate layers;

inputting a first sample image in the group of first sample images to the defect classification student model to obtain a sample feature vector output by each of the plurality of first intermediate layers of the defect classification student model;

obtaining a sample feature vector output by each of the plurality of second intermediate layer groups of the defect classification submodel;

adjusting parameters of the defect classification student model based on the sample feature vector output by each first intermediate layer and the sample feature vector output by each second intermediate layer group; and using the defect classification student model after being adjusted as the defect classification submodel.

9. The method according to claim 5, wherein defect classification submodels obtained through training respectively using the plurality of groups of first sample images have a same quantity of intermediate layers.

10. The method according to claim 5, wherein determining the parameters of the defect classification model based on the parameters of the defect classification submodels obtained through training using the plurality of groups of first sample images comprises:

performing weighted calculation on corresponding parameters of the defect classification submodels trained using the groups of first sample images; and using parameters obtained through the weighted calculation as the parameters of the defect classification model.

11. The method according to claim 1, wherein the backbone model is obtained through training using a plurality of sample images comprising the plurality of first-preset-category defects and the second-preset-category defect.

12. The method according to claim 1, wherein the second-preset-category defect comprises a plurality of sub-preset-category defects, and a similarity between image features of any two of the plurality of sub-preset-category defects is less than a preset threshold.

13. The method according to claim 1, wherein the plurality of first-preset-category defects and the second-preset-category defect are generated in a die-cutting process during cell production.

14. The method according to claim 1, further comprising:

in response to completion of training of the defect detection model, compressing the defect detection model to obtain a compressed defect detection model; and training the compressed defect detection model using the plurality of sample images comprising the plurality of first-preset-category defects and the second-preset-category defect so that a compressed defect detection model obtained through training is capable of predicting the plurality of first-preset-category defects and the second-preset-category defect.

15. An electronic device, comprising:

at least one processor; and a memory communicatively connected to the at least one processor and storing instructions that, when executed by the at least one processor, cause the at least one processor to perform the method according to any claim 1.

16. A non-transitory computer-readable storage medium storing computer instructions that, when executed by a computer, cause the computer to perform the method according to claim 1.

17. A cell defect detection method, comprising:

obtaining an image for inspection;

inputting the image for inspection to a defect detection model to obtain a predicted defect classification result output by the defect detection model, wherein the defect detection model is obtained through training by performing the method according to claim 1; and determining, based on the predicted defect classification result, whether a defect exists in the image for inspection.

18. An electronic device, comprising:

at least one processor; and a memory communicatively connected to the at least one processor and storing instructions that, when executed by the at least one processor, cause the at least one processor to perform the method according to any claim 17.

19. A non-transitory computer-readable storage medium storing computer instructions that, when executed by a computer, cause the computer to perform the method according to claim 17.

* * * * *